United States Patent
Kilian et al.

(10) Patent No.: US 9,896,221 B1
(45) Date of Patent: Feb. 20, 2018

(54) UNMANNED AERIAL VEHICLE (UAV) HAVING A DEPLOYABLE NET FOR CAPTURE OF THREAT UAVS

(71) Applicant: Lockheed Martin Corporation, Bethesda, MD (US)

(72) Inventors: James C. Kilian, Tyngsborough, MA (US); Brede J. Wegener, Cambridge, MA (US); Eric Wharton, Hopkinton, MA (US); David R. Gavelek, Bedford, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 136 days.

(21) Appl. No.: 14/803,888

(22) Filed: Jul. 20, 2015

Related U.S. Application Data

(62) Division of application No. 13/683,033, filed on Nov. 21, 2012, now Pat. No. 9,085,362.

(51) Int. Cl.
    *B64F 1/02* (2006.01)
    *B64C 39/02* (2006.01)

(52) U.S. Cl.
    CPC ............ *B64F 1/02* (2013.01); *B64C 39/024* (2013.01); *B64C 2201/12* (2013.01)

(58) Field of Classification Search
    CPC . B64F 1/02; F42B 12/68; B64C 25/68; B64C 2201/182; B64C 2201/12; B64C 39/024
    (Continued)

(56) References Cited

U.S. PATENT DOCUMENTS 2,957,657 A * 10/1960 Frieder .................. B64F 1/02
                                                    244/110 R
4,174,837 A    11/1979 Benke
                    (Continued)

FOREIGN PATENT DOCUMENTS

CN          102374828 A  *  3/2012
CN          102384702 A  *  3/2012
                    (Continued)

OTHER PUBLICATIONS

Machine language translation of JP 2000199699 A (as disclosed by Applicant).*

(Continued)

*Primary Examiner* — Tien Q Dinh
*Assistant Examiner* — Alexander V. Giczy
(74) *Attorney, Agent, or Firm* — Howard IP Law Group, PC

(57) ABSTRACT

An apparatus for use as part of, or attached to, an unmanned aerial vehicle (UAV) to intercept and entangle a threat unmanned aerial vehicle, includes a flight and payload control system for controlling power to the UAV and for controlling maneuvering of the UAV. A host-side mount may be coupled to the UAV and is in communication with the flight and payload control system. A payload-side mount is removably attached to the host-side mount and includes a power interface and a control interface between the payload-side mount and the host-side mount. A counter-UAV system is coupled to said payload-side mount and includes a deployable net having a cross-sectional area sized for intercepting and entangling the threat unmanned aerial vehicle; and a deployment mechanism for mounting to the unmanned aerial vehicle including a rigid mounting bar and a pair of cords, between which the deployable net is disposed.

12 Claims, 9 Drawing Sheets

(58) Field of Classification Search
USPC .................................. 244/110, 110 C, 110 F
See application file for complete search history.

(56) References Cited

U.S. PATENT DOCUMENTS

| | | | |
|---|---|---|---|
| 5,085,641 A | 2/1992 | Sarnoff et al. | |
| 5,202,533 A | 4/1993 | Vandersteen | |
| 5,567,160 A | 10/1996 | Massino | |
| 5,868,699 A | 2/1999 | Woodruff et al. | |
| 6,098,750 A * | 8/2000 | Reynolds | A62B 1/22 182/112 |
| 6,099,503 A | 8/2000 | Stradella | |
| 6,182,553 B1 * | 2/2001 | Peterson | B63G 7/02 102/403 |
| 6,584,910 B1 | 7/2003 | Plass | |
| 6,886,773 B2 | 5/2005 | Peckham et al. | |
| 6,957,602 B1 | 10/2005 | Koenig et al. | |
| 7,201,348 B1 | 4/2007 | Flammer | |
| 7,328,644 B2 | 2/2008 | Vickroy | |
| 7,410,125 B2 | 8/2008 | Steele | |
| 7,415,917 B2 | 8/2008 | Lloyd | |
| 7,699,261 B2 | 4/2010 | Colten et al. | |
| 7,900,548 B2 * | 3/2011 | Hoadley | F41H 5/007 102/502 |
| 8,038,097 B1 | 10/2011 | Monson et al. | |
| 8,434,711 B2 * | 5/2013 | Berman | F41H 11/04 244/110 C |
| 8,857,754 B2 * | 10/2014 | Ferrari | B64D 1/22 244/110 R |
| 9,085,362 B1 * | 7/2015 | Kilian | B64F 1/02 |
| 2004/0262893 A1 | 12/2004 | Kempf et al. | |
| 2007/0246610 A1 | 10/2007 | Rath et al. | |
| 2007/0261542 A1 | 11/2007 | Chang et al. | |
| 2008/0262427 A1 | 10/2008 | Hommann | |
| 2009/0050750 A1 * | 2/2009 | Goossen | B64C 39/024 244/76 R |
| 2010/0181424 A1 | 7/2010 | Goossen et al. | |
| 2010/0237183 A1 | 9/2010 | Wilson et al. | |
| 2011/0303789 A1 * | 12/2011 | Miller | B64F 1/02 244/110 C |
| 2012/0035787 A1 * | 2/2012 | Dunkelberger | B64C 39/024 701/3 |
| 2012/0211595 A1 | 8/2012 | Johnson et al. | |

FOREIGN PATENT DOCUMENTS

| | | | | |
|---|---|---|---|---|
| EP | 2186728 A1 * | 5/2010 | ........... | B64C 39/024 |
| GB | 529623 A * | 11/1940 | .............. | F41H 11/04 |
| JP | 2000 199699 A | 7/2000 | | |

OTHER PUBLICATIONS

P. Beasley, P. Gray, K. Usher, and N. Bergmann. "Design, Construction and Modelling of a Low Cost Miniature UAV Using Machine Vision"; In Proceedings of the 2007 Australiasian Conference on Robotics and Automation, pp. 1-6. Australian Robotics and Automation Association, 2007.

A. Bolonkin, "AB-Net Method of Protection From Projectiles (city, military base, battle-front, etc.)"; Article Armor of Large Objects, ArXiv e-prints, Jan. 26, 2008.

R.S. Brinkworth, E.-L. Mah, J.P. Gray, and D.C. O'Carroll. "Photoreceptor Processing Improves Salience Facilitating Small Target Detection in Cluttered Scenes"; Journal of Vision, 8:1-17, 2008.

T. Coffey and J.A. Montgomery. "The Emergence of Mini-UAV for Military Applications"; Defense Horizons, 22:1-8, 2002.

C.R. Cosnowski. "Defeating 802.11 Wireless Networks"; Master's Thesis, Air Force Institute of Technology, 2008.

DARPA. SB082-002: Autonomous Detection, Acquisition, Pointing and Tracking of Small UAVS. http://www.dodsbir.net/Sitis/archivesdisplaytopic.asp?Bookrnark=32278.

S.J. Davey, M.G. Rutten, and B. Cheung. "A Comparison of Detection Performance for Several Track-Before-Detect Algorithms"; EURASIP Journal on Advances in Signal Processing, pp. 1-10, 2008.

Maj. D.J. Davis. "Heavy & Agile: Nine Steps to a More Effective Force"; Armed Forces Journal, Jan. 2008. http://www.armedforcesjournal.com/2008/01/3208280.

DoD. DARPA Budget Estimate 2008/2009. http://www.dtic.mil/descriptivesum/Y2009/DARPA/0602702E.pdf.

J.M. Eklund, J. Sprinkle, H.J. Kim, and S. Sastry. "Implementing and Testing a Nonlinear Model Predictive Tracking Controller for Aerial Pursuit/Evasion Games on a Fixed Wing Aircraft"; In Proceedings of the 24th American Control Conference (ACC 2005, pp. 1509-1514, 2005.

P. La Franchi. "Counter-UAV Operations Pose Challenges for Military Planners"; Flight International, Jul. 2, 2007.

B.P. Gerkey, S. Thrun, and G. Gordon. "Visibility-Base Pursuit-Evasion With Limited Field of View"; In Proceedings of the National Conference on Artificial Intelligence, pp. 20-27. AAAI, 2004.

D.M. Gormley. "UAVs and Cruise Missiles as Possible Terrorist Weapons"; In J.C. Motz, editor, New Challenges in Missile Proliferation, Missile Defense and Space Security, chapter 2. Center for Nonproliferation Studies, University of Southampton, 2003.

D. Hall, J. Nascimento, J. Ribeiro, E. Andrade, P. Moreno, S. Pesnel, T. List, R. Emonet, and R.B. Fisher. "Comparison of Target Detection Algorithms Using Adaptive Background Models"; In 2nd Joint IEEE International Workshop on Visual Surveillance and Performance Evaluation of Tracking and Surveillance, pp. 113-120, 2005.

D. Hambling. "Air Force Completes Killer Micro-Drone Project"; Wired Danger Room, Jan. 5, 2010. http://www.wired.com/dangerroom/2010/01/killer-micro-drone/.

J.P. Hespanha, H.J. Kim, and S. Sastry. "Multiple-Agent Probabilistic Pursuit-Evasion Games"; In Proceedings of the 38th Conference on Decision and Control, pp. 2432-2437, 1999.

N. Hodge. "Air Force Zaps Drones in Laser Test"; Wired Danger Room, Nov. 18, 2009. http://www.wired.com/dangerroom/2009/11/air-force-zaps-drones-in-laser-test/.

T.E. Humphreys, B.M. Ledvina, M.L. Psiaki, and P.M. Kintner Jr. "Assessing the Spoofing Threat: Development of a Portable GPS Civilian Spoofer"; In ION GNSS 2008, the 21st International Technical Meeting of the Satellite Division of the Institute of Navigation, pp. 2314-2325, 2008.

B.A. Jackson, D.R. Frelinger, M.J. Lostumbo, and R.W. Button. "Evaluating Novel Threats to the Homeland: Aerial Vehicles and Cruise Missiles"; Technical report, Rand Corporation, 2008.

J. Mandelbaum, J. Ralston, I. Gutmanis, A. Hull, and C. Martin. "Terrorist Use of Improvised or Commercially Available Precision-Guided UAVs at Stand-Off Ranges: An Approach for Formulating Mitigation Considerations"; Technical Report IDA Document D-3199, Institute for Defense Analysis (IDA), Oct. 2005. http://www.dtic.mil/cgibin/GetTRDoc?AD=ADA460419&Location=U2&doc=GetTRDoc.pdf.

E. Miasnikov. "Threat of Terrorism Using Unmanned Aerial Vehicles: Technical Aspects. Technical Report"; Moscow Institute of Physics and Technology Center for Arms Control Energy and Environmental Studies report, Jun. 2004. Translated into English—Mar. 2005. http://www.armscontrol.ru/UAV/UAV-report.pdf.

Office of the Secretary of Defense. Department of defense fiscal year (fy) 2010 budget estimates, May 2009. http://comptroller.defense.gov/defbudget/fy2010/budgetjustification/pdfs/03 RDT and E/ vol. 3 OSD/OSD PB10 RDTE-BA 1-3.pdf.

J.T. Page II, Capt. USAF. "Stealing Zeus's Thunder"; Air & Space Power Journal, Summer 2006. http://www.airpower.maxwell.af.mil/airchronicles/apj/apj06/sum06/page.html.

M. Sirak. "ATK Unveils Counter-UAV Systems as Part of Growing Portfolio"; Defense Daily, Aug. 21, 2007. http://www.findarticles.com/p/articles/mi 6712/i/s 36 235/ai n29374560/.

R.H. Williams(ed.). "Unmanned Aircraft Killer Proposed"; National Defense, Aug. 2004. http://www.nationaldefensemagazine.org/ARCHIVE/2004/AUGUST/Pages/Unmanned3480.aspx.

JIEDDO. Fy 2008 annual report. Technical report, Joint Improvised Explosive Device Defeat Organization, Apr. 2009.

(56) References Cited

OTHER PUBLICATIONS

K. Massey, M. Heiges, and B. DiFranco. "A System-of-Systems Design of a Guided Projectile Mortar Defense System"; In 24th Applied Aerodynamics Conference. AIAA, 2006.

* cited by examiner

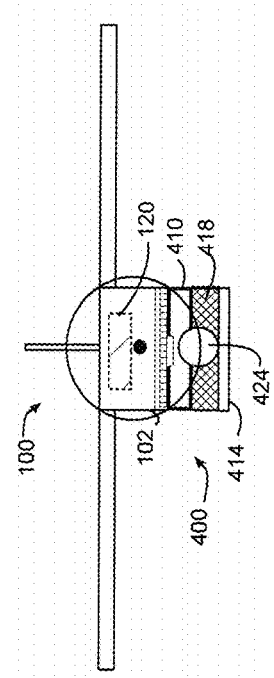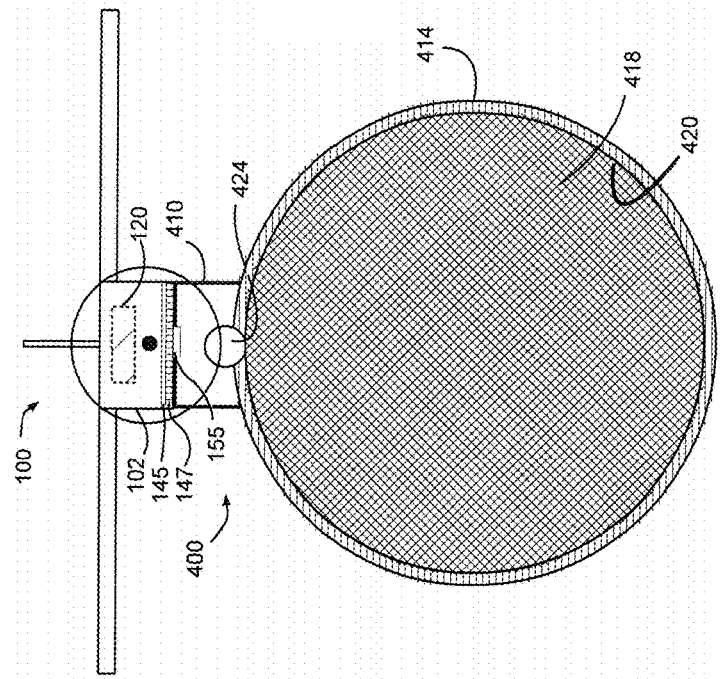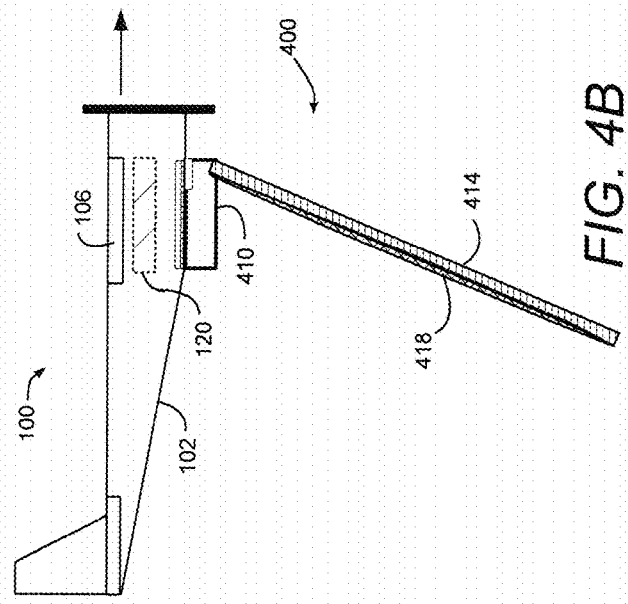

US 9,896,221 B1

UNMANNED AERIAL VEHICLE (UAV) HAVING A DEPLOYABLE NET FOR CAPTURE OF THREAT UAVS

CROSS REFERENCE TO RELATED APPLICATIONS

This application is a divisional application under 35 U.S.C. § 121 and claims priority to U.S. patent application Ser. No. 13/683,033 filed Nov. 21, 2012, entitled COUNTER-UNMANNED AERIAL VEHICLE SYSTEM AND METHOD, which is incorporated by reference herein in its entirety.

FIELD OF THE INVENTION

The present disclosure relates to unmanned aerial vehicles (UAVs). More particularly, the present disclosure relates to an unmanned aerial vehicle having a deployable net capture apparatus to enable, while in flight, the non-destructive interception and entanglement of a threat unmanned aerial vehicle.

BACKGROUND

A recent area of concern is the increasing use of unmanned aerial vehicles (UAVs) by hostile adversaries. UAVs small enough to be portable (i.e. human-portable) are often termed miniature (mini) or micro unmanned air vehicles (mUAV, collectively). Such UAVs can be assembled from commercially off-the-shelf materials. A typical mUAV has a wingspan of less than or equal to about three meters, operates at altitudes of less than or equal to about five hundred feet (500 ft.), and can carry a payload of about 1 kilogram (kg) or less to about 30 kg. Electric motors may provide UAVs with acoustic stealth. Commercially available miniature flight control computers and sensors provide mUAVs with some degree of autonomy, mitigating the need for line of sight operation.

It is anticipated that inexpensive mUAVs may be used by adversaries not only for intelligence, surveillance, and reconnaissance (ISR), but also as weapon delivery platforms that may carry explosive, chemical, radiological, and/or biological payloads. Attempting to destroy mUAVs carrying such payloads makes possible inadvertent abetting of an adversary's mission. That is, conventional attempts to destroy an mUAV may not neutralize the payload, but may actually assist in dispersing chemical or biological agents over an area.

Alternative systems and methods for controlling and containing a threat or hostile weaponized mUAV are desired.

SUMMARY

An apparatus is disclosed herein for use with an unmanned aerial vehicle to intercept and entangle a threat UAV. In one embodiment of the disclosure, the apparatus comprises a multi-component system comprising (1) a host UAV platform including an integral host-side flight and payload control system comprising ground station and onboard systems including communications systems, flight control computer and actuators; (2) an integral host-side mount which provides means for attachment, power interface, and payload control interface; (3) an integral payload-side mount which accepts means for attachment, power interface, and control interface; (4) an integral host-side deployment mechanism which precipitates the action of a payload-side deployment mechanism; (5) an integral payload-side deployment mechanism which is connected to the payload-side mount, taps available power, and converts control signals into payload actions; (6) an integral payload, which is connected to the deployment mechanism and/or payload-side mount and embodies the desired action of deploying a net or other ensnaring mechanism having a cross-sectional area sized for intercepting and entangling the threat UAV. The deployed net maintains a maximum intercept cross-section through the use of either rigid rods or an inflatable frame. The apparatus is designated as a net capture UAV.

Further disclosed herein is an apparatus for use with an unmanned aerial vehicle to intercept and entangle a threat unmanned aerial vehicle. The apparatus comprises a multi-component system comprising: (1) an attachable payload-side mount which accepts means for attachment, power interface, and control interface; (2) an attachable payload-side deployment mechanism which is connected to the payload-side mount, taps available power, and converts control signals into payload actions; (3) an attachable payload, which is connected to the deployment mechanism and/or payload-side mount and embodies the desired action of deploying a net having a cross-sectional area sized for intercepting and entangling the threat unmanned aerial vehicle. The deployed net maintains a maximum intercept cross-section through the use of either rigid rods or an inflatable frame. The apparatus is designated as a net capture mission package, which is to be interchangeably mountable on any suitably-sized and powered UAV.

BRIEF DESCRIPTION OF THE DRAWINGS

FIG. 3A shows the DNC apparatus in an undeployed state and FIG. 3B shows the DNC apparatus in a deployed state.

FIGS. 4A and 4B are front elevational views of a UAV illustrating another exemplary embodiment of a DNC apparatus of the present disclosure, where FIG. 4A shows the DNC apparatus in an undeployed state and FIG. 4B shows the DNC apparatus in a deployed state.

FIG. 4C is a side elevational view of the UAV and DNC apparatus of FIGS. 4A and 4B, showing the DNC apparatus in the deployed state.

DETAILED DESCRIPTION

Figure 1:
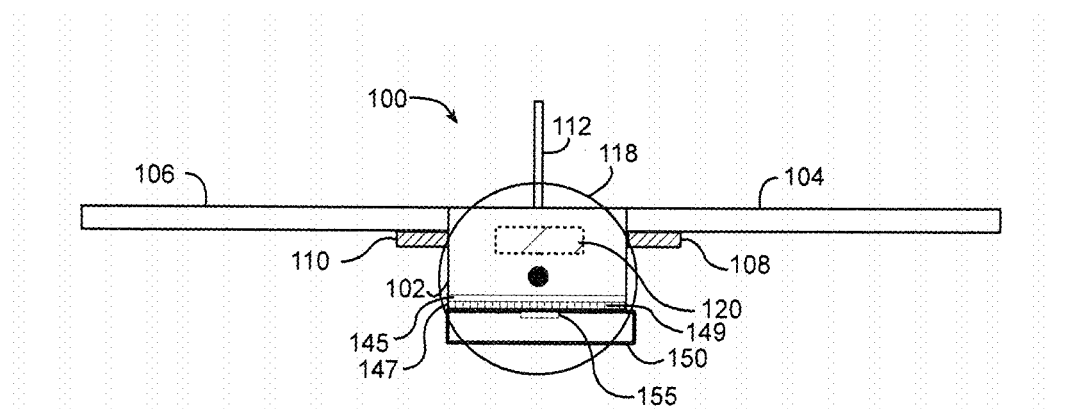
FIGS. 1 and 2 are front and side elevational views of an exemplary embodiment of an unmanned aerial vehicle (UAV) with a deployable net capture (DNC) apparatus of the present disclosure.

Before embarking on a detailed description, the following should be understood. The threat posed by mini or micro unmanned aerial vehicles (mUAVs) continues to increase as hostile entities adapt to countermeasures which are becoming more effective against more traditional forms of asymmetrical attack such as improvised explosive devices (IEDs). UAVs have become an essential part of military operations. The success of UAVs have driven the development of UAV technology to the point where UAVs may be made available to almost any force as a low end UAV may cost as little as a few thousand dollars. The utility of UAVs has been found to have potential as a highly effective platform for a variety of missions. For example, UAVs may be used for reconnaissance, enhanced communications, electronic warfare, delivery systems for IEDs and provided controlled release of biological, radiological and/or chemical agents. In addition, UAVs provide that added operational features of operation at low altitudes and low air speeds, operating at short range, deployable in distributed swarms and provide a small cross-section that is difficult to detect through conventional radars. As the availability and functionality of UAVs continues to increase, the importance of counter measures designed to detect, destroy and deny threat UAVs increases proportionally.

As a threat UAV may be armed with a hazardous payload, such as a biological, radiological or chemical agent, the simple destruction of such a threat UAV may actually aid in the mission of the threat UAV. For example, a payload of biological, radiological or chemical agent carried by the adversary UAV may actually be more widely dispersed if the UAV is intercepted and destroyed. Local area deployments, for example, within an urban setting where an assisted threat UAV may be launched and reach its target entirely within a local region that makes perimeter surveillance systems, such as radar ineffective, further illustrate the need for caution in interception and destruction of the threat UAV. In order to fully negate the mission of a weaponized mUAV, methods for controlling and containing the UAV along with techniques for neutralizing its payload must be considered. In order to provide such a non-abetting counter UAV measure, a number of events must occur: (1) the threat UAV must be detected; (2) the threat UAV must be tracked; (3) the threat UAV must be stripped of its flight control; (4) the threat UAV must be prevented from communicating with its ground control; (5) the threat UAV must be captured and moved to a safe location; and (6) the threat UAV must be isolated. One manner of achieving these objectives is through the use of UAV-borne technologies that serve to control and contain small weaponized adversary UAVs in order to minimize inadvertent collateral damage associated with the destruction or disabling of the adversary UAV while still safely negating its mission. The use of UAV-borne countermeasures provides proximity to the threat UAV, potentially well away from the intended target without providing cues as to the presence of those targets to other lurking threats. In addition, proximity allows for mechanical interaction with the threat UAV. Furthermore, options for cooperative pursuit and mission negation exist using a swarm of counter-UAVs providing further flexibility of UAV-borne counter-UAV concepts.

Figure 2:
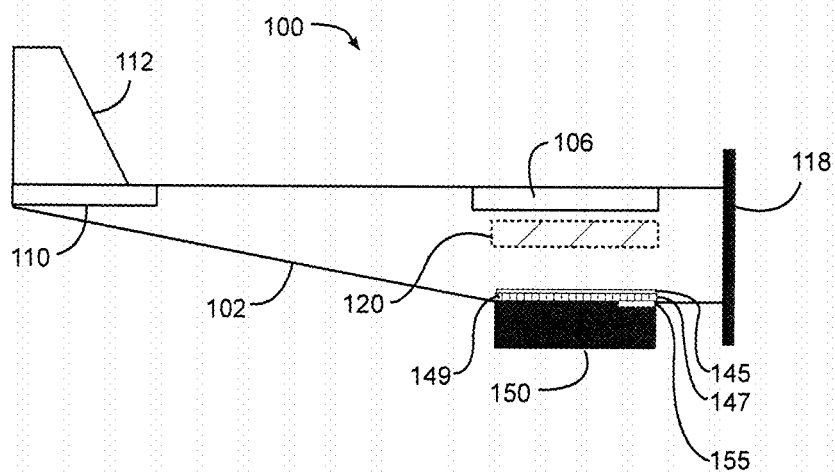

FIGS. 1 and 2 collectively show an exemplary embodiment of an unmanned aerial vehicle (UAV) 100 having a deployable net capture (DNC) apparatus 150 of the present disclosure as either an integral part of the UAV 100 or rigidly attached to the UAV 100. The UAV 100 may comprise a fixed wing UAV. The UAV 100 may be configured to fly autonomously or be piloted remotely. In other embodiments, the UAV may comprise a rotary wing UAV. The DNC apparatus 150 deploys a net that is configured to provide a large cross-sectional area for intercept and entanglement of a threat UAV caught in the deployed net. DNC apparatus 150 includes a release mechanism 155 which is configured to detach the deployed net from the UAV 100 when a target is ensnared in the deployed net. The size of the net is bounded by the capability of the host aircraft. In particular, the weight of the payload-side components (either integral or attachable) along with the drag on the aircraft while the net is deployed limit the usable size of the open net. DNC apparatus 150 may be coupled to a host-side mount 145 coupled to UAV 100 via a payload-side mount 147, which includes a power and control interface. Payload-side mount 147 further is connected to a deployment mechanism 149 for receiving power and converting control signals into payload actions.

The UAV 100 includes fuselage 102, left and right main wings 104, 106, left and right horizontal stabilizers 108, 110, and vertical stabilizer 112. The UAV 100 can be propelled via a front or rear mounted internal combustion engine or electric powered motor (not shown). The engine or motor is configured to operate a propeller 118 (shown in motion). The propeller 118 can be disposed at the front of the fuselage 102 as shown, or disposed at the rear of the fuselage. Alternatively, the UAV 100 can be propelled by a jet propulsion system.

The fuselage 102 of the UAV is configured to carry any number of desired payloads, including but not limited to, different types of navigational systems such as Global Positioning System or GPS. The UAV may employ an integral host-side flight and payload control system 120 that includes ground station and onboard systems including communications systems, flight control computer and actuators. The host-side flight and payload control system 120 allows the flight modes, flight path, and mission tasking to be modified, if desired, in-flight.

Figure 3A:
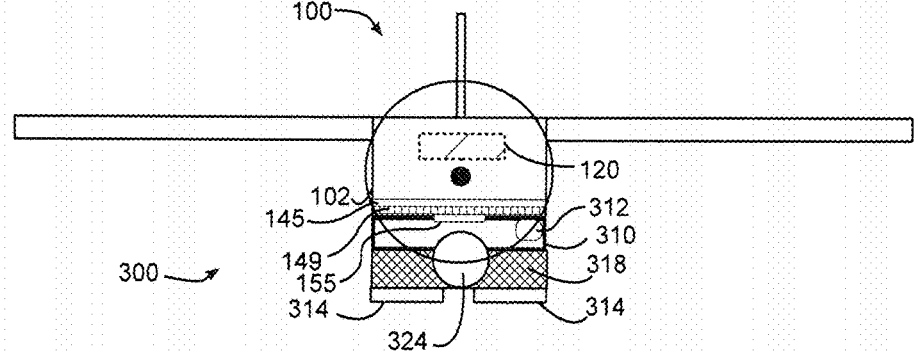
FIGS. 3A and 3B are front elevational views of a UAV illustrating an exemplary embodiment of a DNC apparatus of the present disclosure, where
Figure 3B:
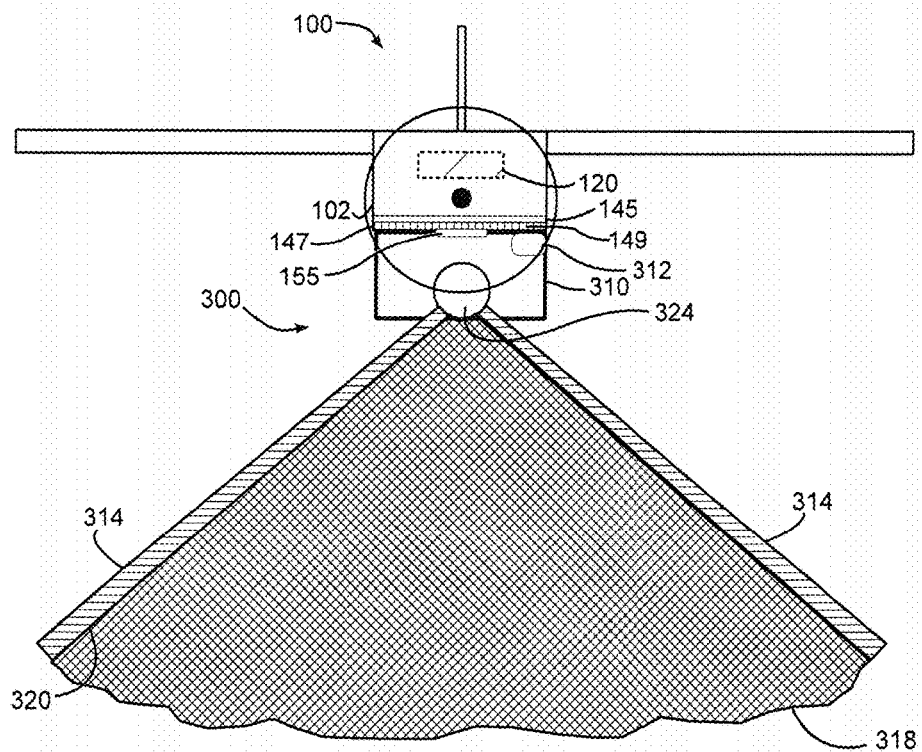

FIGS. 3A and 3B collectively show a first exemplary embodiment of the DNC apparatus of the present disclosure, denoted by reference numeral 300. The DNC apparatus 300 includes a pressurized air canister or reserve tank 310, an inflatable open frame with two cylindrical arms 314, which inflate to a rigid frame (FIG. 3B), a net 318 disposed between the frame arms 314, and an electronically controlled valve 324 for allowing air from the tank 310 to enter and inflate the frame 314 when the valve 324 is opened. As shown in FIG. 3B, the net 318 has a pie or wedge shape configuration when deployed. The net 318 may be made from a multifilament net or any other suitable netting material. Lateral edges 320 and 322 of the net 318 are attached to the frame by threading the net through a perforated ridge that is part of the inflatable open frame configuration 314.

Additional electronic circuitry enables the electronically controlled valve 324 to communicate with the host-side payload control system 120 (FIG. 2). The control signal received from the host-side control system 120 causes electronically controlled valve 324 to open and allow air from the tank 310 to enter and inflate the frame 314. Most UAV are remotely piloted, so the signal that deploys the capture net 318 originates from the remote human pilot. In an autonomous hunter UAV 100, the signal to deploy the capture net 318 is generated by onboard processing of onboard sensors.

As shown in FIG. 3A, the net 318 and inflatable open frame 314 are rolled-up into a roll-shaped package. The roll-shaped packaging minimizes the volume of the DNC apparatus 300 while allowing an untangled inflation of the frame 314 when pressurized air is released from the tank 310 and into the frame 314 by opening the valve 324.

As shown in FIGS. 3A and 3B, the tank 310 of the DNC apparatus 300 is mounted to the bottom or other portion of the fuselage 102 of the UAV 100. For the UAV 100 at rest, the deployed open frame 314, depends or hangs vertically (i.e. "straight down") normal to the major axis of the fuselage of the UAV 100. The two arms of the inflatable open frame 314 form essentially a 90 degree angle when inflated. In an exemplary embodiment, the diameter of each arm of the frame 314 may be about 5 millimeters (mm) with a length for each arm of about 2 meters. When deployed, the inflatable open frame 314 inflates to a pressure of about 500 psi so that the frame 314 becomes rigid thereby causing the attached net 318 to spread apart and be held in place. A polyester film, for example, biaxially-oriented polyethylene terephthalate (BOPET), may be selected over other materials in order to achieve the desired rigidity with minimal deformation when inflated. One hundred gauge (0.001 in) polyester film has a tensile strength on the order of 30,000 psi. This well exceeds the required pressure of an inflatable frame in accordance with this specification. The mounting block has short rigid sleeves 10 cm in length and 1 cm in diameter and made of plastic that serve as guides when the open inflatable frame in inflated. The sleeves hold the frame arms so the desired angle between them is achieved and their plane is perpendicular to the direction of flight. UAV 100 further includes release mechanism 155 configured to deflate the inflatable frame 314 and detach the inflatable frame 314 and the net 318 from the UAV when a target UAV is ensnared or captured in the net 318. In an embodiment, a parachute 312 is attached to the inflatable frame 314 which is configured to deploy when the inflatable frame 314 and net 318 are detached from the UAV by the release mechanism.

FIGS. 4A, 4B and 4C collectively show another exemplary embodiment of a DNC apparatus of the present disclosure, denoted by reference numeral 400. The DNC apparatus 400 includes a pressurized air canister or reserve tank 410, an inflatable closed frame 414, which when inflated is ring-shaped (FIG. 4B), a net 418 disposed within the frame 414, and an electronically controlled valve 424 for allowing air from the tank 410 to enter and inflate the frame 414 when the valve 424 is opened. As shown in FIG. 4B, the net 418 has a cone shape when deployed. The aperture of the inflatable closed frame faces the flight direction of the host UAV. The diameter of the frame tube may be about 5 mm with an aperture diameter of about 2 meters. When deployed, the inflatable closed frame 314 inflates to a pressure of about 500 psi so that it becomes rigid, thereby causing the attached net 418 to spread apart and be held in place. Polyester film, for example, biaxially-oriented polyethylene terephthalate (BOPET), may be selected over other materials in order to achieve the desired rigidity with minimal deformation when inflated. One hundred gauge (0.001 in) polyester film has a tensile strength on the order of 30,000 psi well-exceeding the requirements of this application. The net 418 may be made from a multifilament net or any other suitable netting material. The outer edge 420 of the net 418 is attached to the inner edge or side of the frame 414 by threading the net through a perforated ridge that is part of the frame 414.

Additional electronic circuitry enables the electronically controlled valve 424 to communicate with the host-side payload control system 120 (FIG. 2). The control signal received from the host-side control system 120 causes electronically controlled valve 424 to open and allow air from the tank 410 to enter and inflate the frame 414. Most UAVs 100 are remotely piloted, so the signal that deploys the capture net 418 originates from the remote human pilot. In an autonomous hunter UAV 100, the signal to deploy the capture net 418 is generated by onboard processing of onboard sensors.

As shown in FIG. 4A, the net 418 and the closed inflatable frame 414 are rolled-up into a roll-shaped package. The roll-shaped packaging minimizes the volume of the DNC apparatus 400 while allowing an untangled inflation of the frame 414 when pressurized air is released from the tank 410 and into the frame 414 by opening the valve 424.

As shown in FIG. 4C, the tank 410 of the DNC apparatus 400 is mounted to the bottom or other portion of the fuselage 102 of the UAV 100. In an exemplary embodiment, the mounting block includes a short rigid sleeve covering about the top 50 cm of the inflated ring. The sleeve itself may be about 1 cm in diameter and made of plastic that serves as a guide when the open inflatable frame in inflated. The sleeves hold the plane of the frame perpendicular to the direction of flight.

FIGS. 5A, 5B, 5C and 5D collectively show a further exemplary embodiment of the DNC apparatus of the present disclosure, denoted by reference numeral 500. The DNC apparatus 500 includes a containment device 501 and a curtain net assembly 510 that is held by the containment device 501.

Figure 5A:
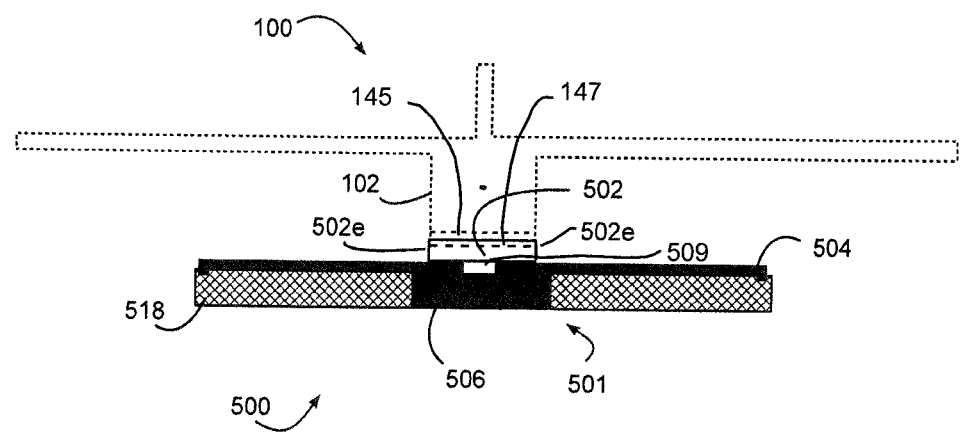
FIG. 5A is a front elevational view of a UAV illustrating another exemplary embodiment of a DNC apparatus of the present disclosure, showing the DNC apparatus in an undeployed state.
Figure 5B:
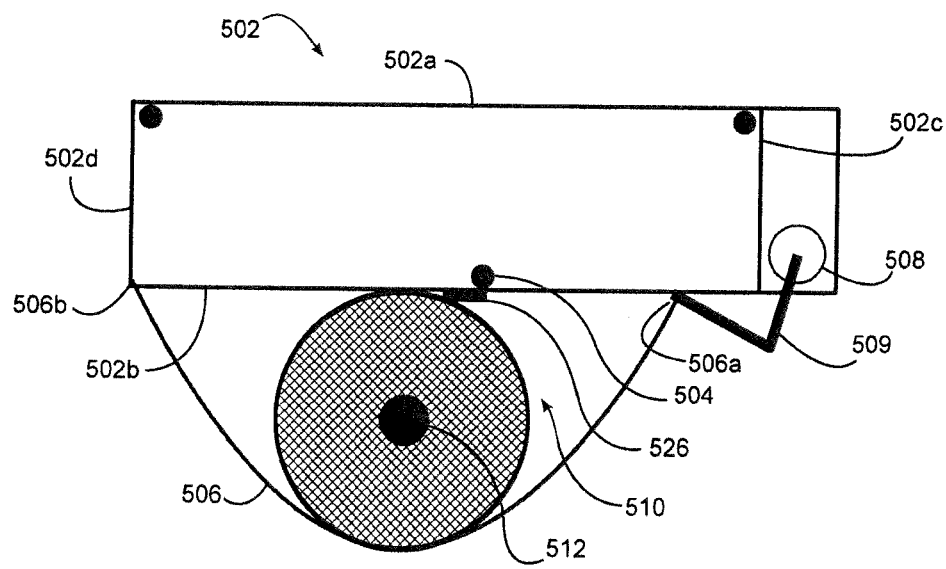
FIG. 5B is a side elevational view of the DNC apparatus of FIG. 5A, showing the DNC apparatus in an undeployed state.
Figure 5C:
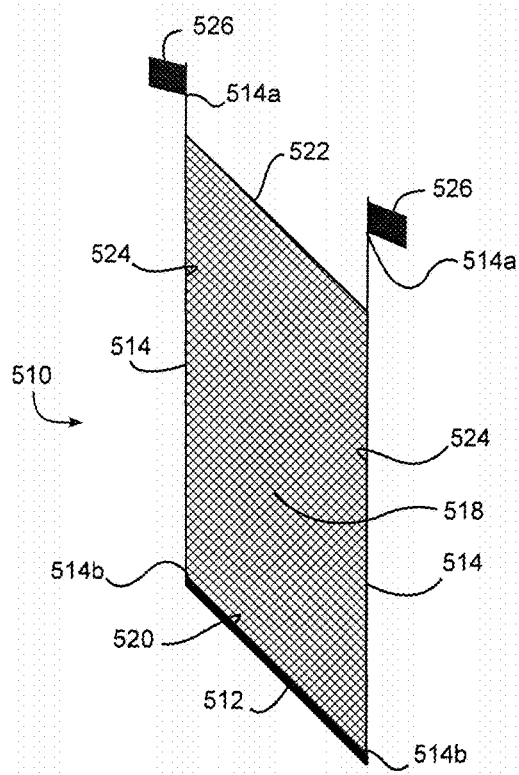
FIG. 5C is a perspective view of a net assembly of the DNC apparatus of FIGS. 5A and 5B in the deployed state.

As shown in the exemplary embodiment of FIG. 5C, the net assembly 510 includes a rectangular or square shape curtain net 518 that can be made from a multifilament net or any other suitable netting material. A bottom edge 520 of the net is attached to a rod-like member 512 (rod member 512) that generally extends the width of the net 518. The rod member 512 typically has a cylindrical cross-sectional shape, which allows it to be used to roll-up the net 518, as will be explained hereinafter. In other embodiments, the rod member 512 may have other suitable cross-sectional shapes, including, without limitation, a square or oval shape. The rod member 512 may be made of graphite, aluminum or any other suitable lightweight material. The net assembly 510 also includes a cord-like member 514 (cord member 514) that threads or weaves through the netting of the net 518 adjacent each lateral edge thereof 524. The cord member 514 may be made of lightweight nylon cord or spring steel wire. The bottom end 514b of each cord member 514 is connected to or at one end of the rod member 512. The top end 514a of each cord member 514 extends slightly above the top edge 522 of the net 518. A frangible tab 526 is attached or connected at the top end 514a of each cord member 514. The frangible tabs 526 may be made of paper or any other frangible material. The frangible tabs 526 may also include score lines or perforations (not shown) to enhance the frangibility of the tabs 526.

Figure 5D:
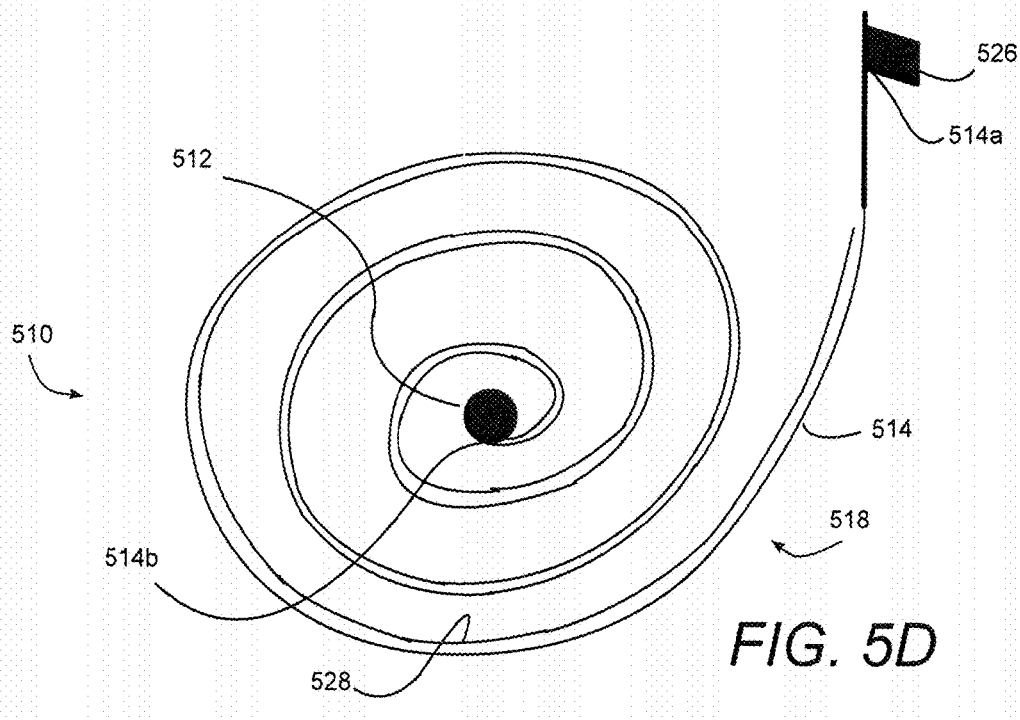
FIG. 5D is a side view of the net assembly of FIG. 5C being rolled into the undeployed or rolled-up state.

The net assembly 510 is held by the containment device 501 in a rolled-up or rolled state, as shown in FIGS. 5A and 5B. As shown in FIG. 5D, the net 518 is rolled into the rolled state by laying a separator sheet 528 on the net 518 and rotating the rod member 512 into the net 518 and the separator sheet 528. The rotation of the rod member 512 rolls the net 518 and the separator sheet 528 onto the rod member 512. In the rolled state, the separator sheet 528 separates rolls of the net 518 from one another to prevent tangling of the net 518. The separator sheet 528 can be made of a tissue-paper-like material or any other suitable material that is capable of being easily rolled with the net 518 to prevent tangling of the rolled net 518. In other embodiments, the separator sheet 528 can be omitted if tangling of the net 518 is not an issue.

Referring again to FIG. 5A, the containment device 501 is mounted to the bottom or other portion of the fuselage 102 of the UAV 100, so that the net 518 in the unrolled, deployed state or position, is horizontal and perpendicular to the forward motion (aircraft vector velocity) of the UAV 100. The containment device 501 includes a sling box 502, a net assembly mounting bar 504, a lightweight flexible sling 506 capable of holding the rolled net assembly, and a servo 508 with a clamp member 509 for releasing the sling 506 upon receiving a control signal from the from the UAV flight and payload control system 120 (FIG. 2). In one exemplary embodiment, the sling box 502 is formed as a rigid housing including top, bottom, front, rear, and side walls 502a through 502e. The top wall 502a of the sling box 502 is fastened to the bottom portion of the fuselage 102 of the UAV 100. The servo 508 is mounted to the front wall 502c of the sling box 502. The net assembly mounting bar 504, made of graphite, aluminum or other lightweight rigid material, extends the width of the net 518 and is mounted to the bottom wall 502b of the sling box 502 between the front and rear walls 502c, 502d thereof such that the ends of the bar 504 extend beyond the side walls 502e (FIG. 5A) of the sling box 502. A trailing edge 506b of the sling 506 is attached to the bottom wall 502b of the sling box 502 adjacent the rear wall 502d. A leading edge 506a of the sling 506 is clamped to the bottom wall 502b of the sling box 502 by the servo actuated clamp member 509. The servo 508 includes electronic circuitry that enables it to communicate with the UAV flight and payload control system 120 (FIG. 2) by wire or wirelessly, so that it can receive the control signal from the UAV flight and payload control system 120. The frangible tabs 526 at the top ends of the cord members 514 are attached to connectors (not shown) affixed to the ends of net assembly mounting bar 504.

In operation, when the servo 508 receives a control signal from the UAV flight and payload control system 120, the servo 508 moves the clamp member 509 to release the leading edge 506a of the sling 506 from the bottom wall 502b of the sling box 502, which allows the sling 506 to fall open, releasing the rolled net 518 so that it unrolls into the deployed state. Since the top ends 514a of the cord members 514 remain attached to the mounting bar 504, via the connectors and the tabs 526, the net 518 unrolls the length of the cord members 514. The rod member 512 at the bottom of the net 518 prevents the net 518 from entangling itself once deployed. When the net 518 encounters a sufficient force, for example, when a threat UAV is entangled in the net 518, the frangible tabs 526 holding the cord members 514 (and therefore the net assembly 510) to the mounting bar 504 of the containment device 501 disengage the net assembly 510 from the UAV 100, thereby allowing the net assembly 510 to fall free.

Figure 6:
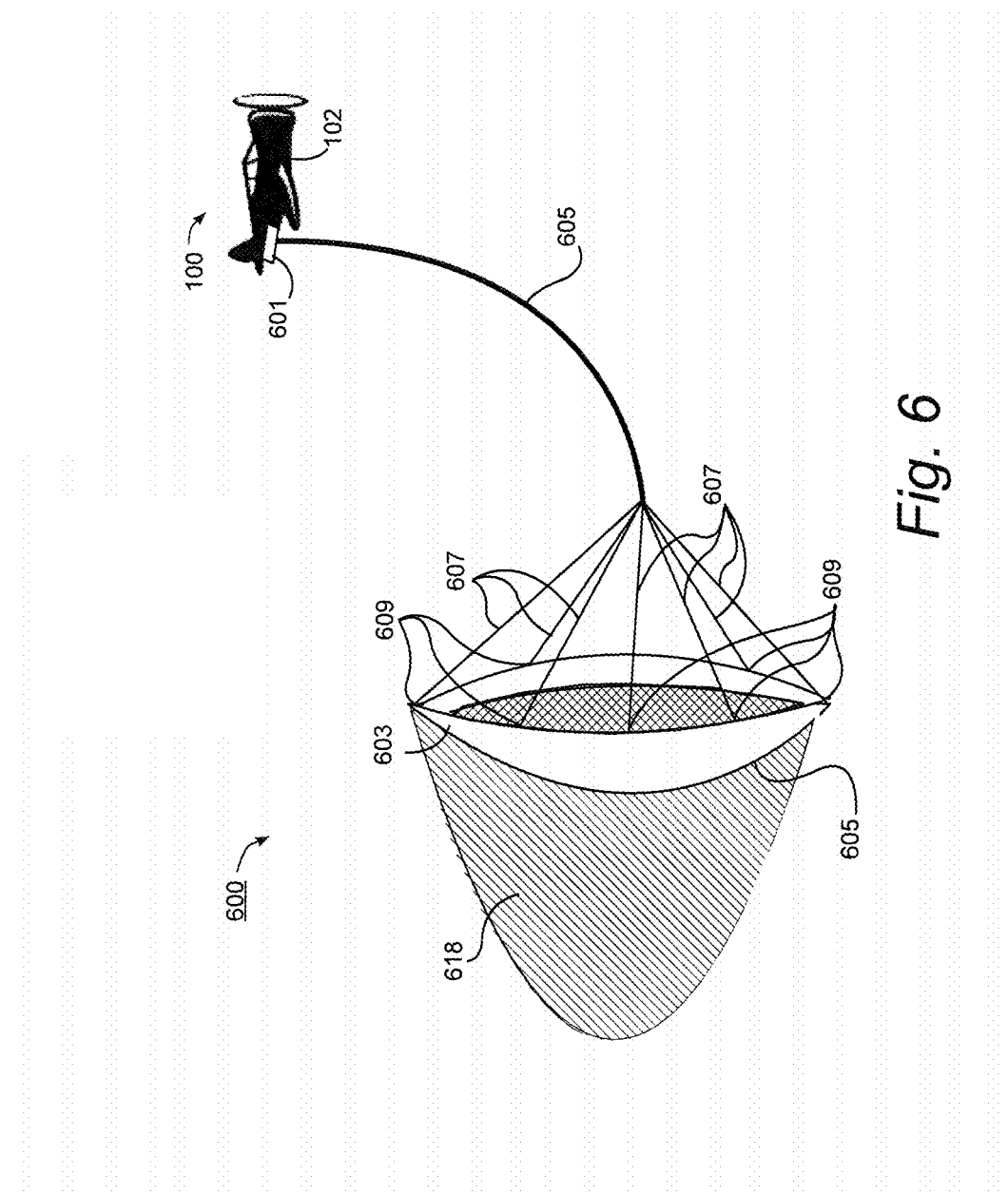
FIG. 6 is a perspective view of a UAV illustrating another exemplary embodiment of a DNC apparatus in accordance with the present disclosure and showing the DNC apparatus in a deployed state.

FIG. 6 is an illustration of a UAV 100 having a DNC 600 according to an embodiment of the present disclosure. The DNC 600 of FIG. 6 utilizes a parachute 603 having its center section removed and replaced with a capture net 618.

UAV 100 includes a canister 601 attached to the fuselage 102 of UAV 100. Canister 601 may be used when the chute net DNC apparatus 600 is in an undeployed state. The DNC apparatus 600 is towed from UAV 100 by use of a tether or tow line 605 which is attached at one end to canister 601, and to attachment lines 607 at the other end of tow line 605. The attachment lines 607 are attached at points 609 to parachute 603. The parachute 603 has its center portion removed and replaced by net 618. The net 618, for example, may be made of multi-filament netting of sufficient strength and flexibility to capture and hold a target UAV or midair object. The net 618 is attached at an inner edge of parachute 603. When the UAV 100 is traveling with forward velocity, the DNC 500 including net 618 is towed aft of the UAV 100. Through air resistance, the opening formed by parachute 603 is stretched to allow entry to net 618. During flight operations, the net 618 passes through the air with less drag than would occur if UAV 100 were towing a solid parachute.

In an undeployed state, the net 618, chute 603 and tow line 605 are packed and stowed in canister 601. While stowed in the canister 601, the UAV 100 is capable of intense maneuvering without experiencing detrimental effects of drag caused by the DNC apparatus 600. During deployment, the canister 601 is opened, and the relative wind created by the forward velocity of UAV 100 acts to inflate the chute 603. As the wind inflates the chute 603, the edges of chute 603 are pulled outward, thereby tightening the center portion at net 618.

Parachute 603 and net 618 may be easily and conveniently packed into canister 601 for transport using a relatively small space. The deployed DNC 600 may be configured with a large net 618 area thereby increasing the probability of capture of a target.

According to one of the embodiments described hereinabove in FIGS. 1-6, a threat UAV may include a weapon delivery platform in which destruction of the threat UAV may aid in the delivery of the weapon. For example, a chemical or biological agent may be dispersed upon the destruction of the threat UAV carrying the hazardous payload. When the threat is initially detected, a hunter UAV may be transitioned into a predatory mode. While operating in predatory mode, the UAV tracks and homes in on a detected threat UAV, seeking to disable or capture the threat UAV utilizing, by way of non-limiting example, one of the DNC apparatuses described in FIGS. 1-6. Once the threat UAV is captured, it may be towed to a predetermined safe area, where the threat UAV may be neutralized or scanned for intelligence data. Alternatively, the hunter UAV may capture the threat UAV and enter a holding maneuver to wait for a separate retrieval system to collect the captured threat UAV.

Figure 7:
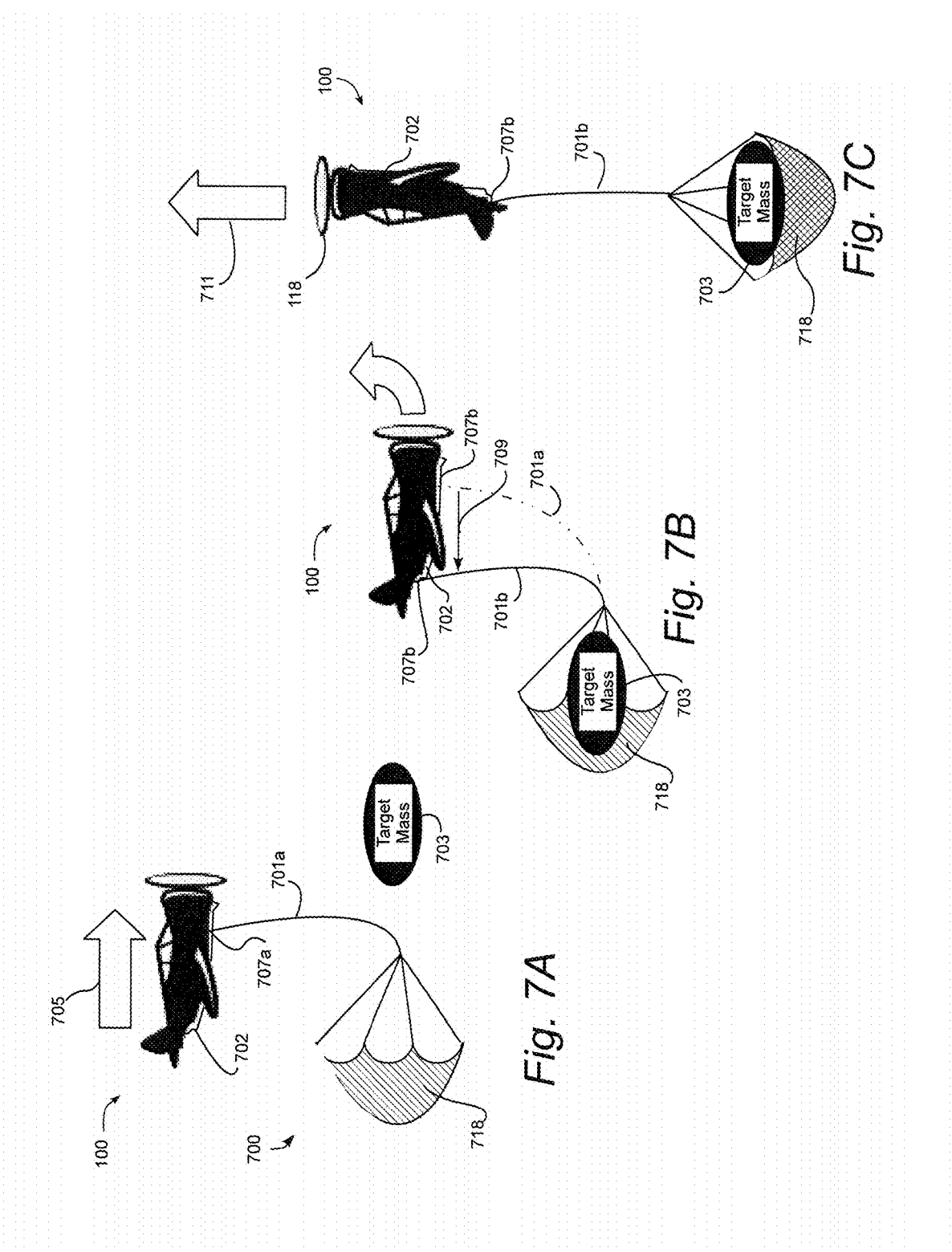
FIGS. 7A, 7B and 7C illustrate the DNC apparatus of FIG. 6 through deployment and capture of a threat UAV.

FIGS. 7A, 7B and 7C illustrate a holding maneuver in which a tailstand hover is used to provide a controlled descent of a captured UAV. Referring to FIG. 7A, a hunter UAV 100 is shown airborne and having a forward velocity indicated by arrow 705. On the underside of the UAV 100, a track 702 is installed and configured for attachment at attachment point 707a of a tow cord at a first position 701a. The tow cord, denoted generally as 701, is attached at its end to a deployable net capture apparatus 700. The DNC 700 is shown in FIG. 7A as a parachute shaped net 718, however it should be understood that any DNC 700 capable of surrounding, entangling or capturing a target UAV may be used. A target mass 703 is suspended and identified by the host-side flight and payload control system 120 (FIG. 2) as a target. Target mass 703 may be, by way of non-limiting example, a threat UAV armed with a weapon delivery system. The hunter UAV 100 is positioned such that the UAV 100 overtakes the target mass 703 and captures the target mass 703 in the DNC 700 being towed by UAV 100, as shown in FIG. 7B. When the target mass 703 becomes entangled in net 718, the additional mass creates a force sufficient to disengage tow cord 701a from its attachment point denoted as 707a and slide along track 702 in a direction 709, that causes the first end of tow cord 701 to slide down track 702 from a first attachment point 707a to a second attachment point 707b. Attachment point 707b is proximal to the tail of the hunter UAV 100. Tow cable denoted by solid line 701b is shown from an attachment point 707b proximal to the empennage of UAV 100.

Referring to FIG. 7C, the target mass 703 is sufficient to cause the UAV 100 to pitch to a vertical position by applying a downward force, due to gravity, to tow cable 701b attached proximal to the empennage of the UAV 100 at attachment point 707b. The vertical orientation of UAV 100, with propeller 118 pointed upward, creates thrust that pulls the UAV 100 and target mass 703 in an upward direction indicated by arrow 711. The host-side flight and payload control system 120 (FIG. 2) may be programmed to control the thrust generated by propeller 118 to enter a hovering mode, which holds the target mass 703 until a separate retrieval vehicle may be dispatched to the scene, or thrust may be provided by propeller 118 such that the target mass 703 and attached UAV 100 are lowered to the ground in a controlled descent.

Figure 8:
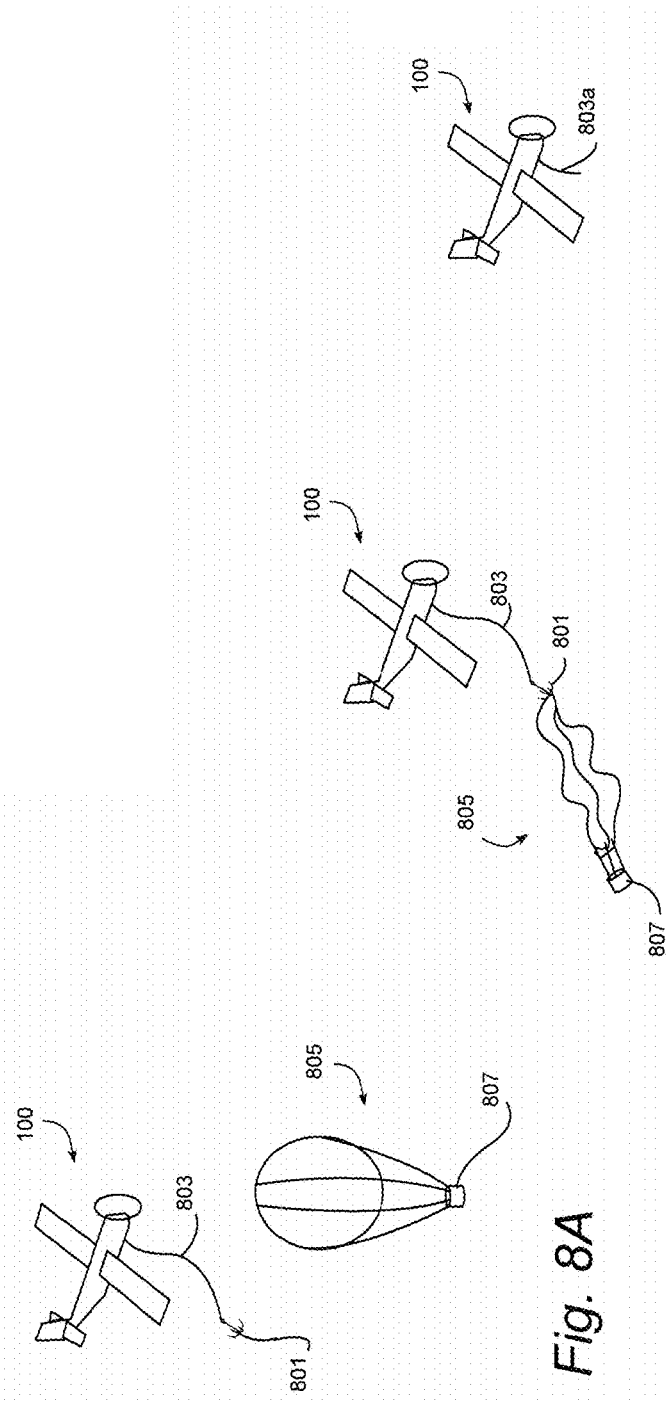
FIGS. 8A, 8B and 8C are illustrations of an apparatus for the disablement and containment of a threat UAV.

FIGS. 8A, 8B and 8C illustrate an airborne retrieval of a threat target in midair and travelling at a low velocity by a hunter UAV 100. The UAV 100 is programmed to fly to a rendezvous location characterized as an intercept point with the target 805 as shown in FIG. 8A. The rendezvous location may have been determined, for example, by sensors configured to detect a potential threat and label the potential threat as a target for retrieval 805. The target 805 may carry a payload 807 which may be deployed as part of a systematic attack making the target 805 part of a weapons delivery system. For example, payload 807 may include chemical/biological agents which are intended to be dropped as part of an offensive attack. Once the rendezvous location is determined, the UAV 100 is programmed to intercept the target 805 at the rendezvous location. The UAV may be controlled by host-side flight and payload control system 120 (FIG. 2). Upon approaching the identified target 805, the host-side flight and payload control system 120 generates a signal operative to deploy a hook 801. Hook 801 is attached to a tow line 803 at a first end. Tow line 803 is attached at its second end to the fuselage 102 (FIG. 1) of UAV 100. UAV 100 may include a deployment mechanism that stows hook 801 and tow line 803 until the UAV 100 reaches the rendezvous location at which time the hook 801 is deployed by releasing the hook 801 an allowing it to fall and be towed by UAV 100. Host-side flight and payload control system 120 positions the UAV 100 such that the hook 801 strikes target 805, causing the suspension system of target 805 to deflate or become disengaged from payload 807. The UAV 100 then flies to a designated delivery location with the target 805 and payload 807 in tow as shown in FIG. 8B.

Referring to FIG. 8C, when the UAV 100 arrives at the delivery location, the UAV 100 disengages the hook 801 allowing the target 805 to fall. For example, a release (not shown) may be included with tow line 803 which receives a release signal from the host-side flight and payload control system 120 and causes section 803a of the tow line 803 to detach from section 803b of the tow line attached to the hook 801 and ensnared target 805. The landing area may include a landing net (not shown) designed to catch the target 805 without allowing destruction of the target 805 and associated payload 807 resulting from the fall.

Figure 9:
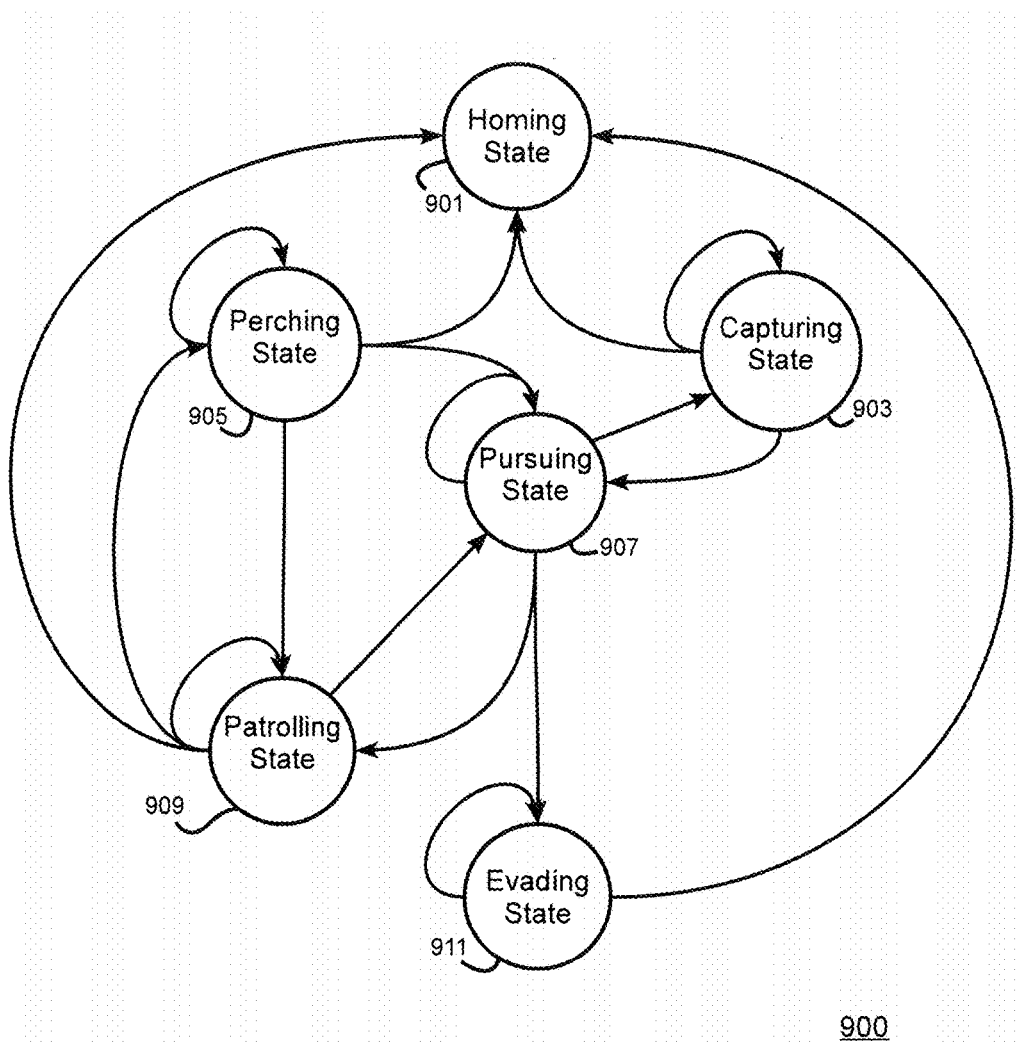
FIG. 9. is a state transition diagram for a predatory unmanned aerial system.

According to an embodiment described herein, behavior-based autonomy may be utilized to provide non-abetting counter-UAV measures for detection and pursuit of a threat UAV. The behavior of a predatory UAV may be envisioned as a finite state machine. FIG. 9 illustrates an exemplary state transition diagram 900 which may be used in an embodiment of a non-abetting UAV-borne countermeasure. The states in which the predator UAV may exist are shown as circles in FIG. 9. Homing 901 is a state in which the predator UAV is instructed to return to a home location. The home location may be the point of origin at which the predator UAV began its mission, or alternatively, may be any other controlled safe location designated by the operator of the predator UAV. For example, a remote location may be established for re-fueling, collection of intelligence information collected by the predator UAV, or may be a location where, upon capture and control of a threat UAV, the threat UAV is taken for disposal, intelligence scanning or disarming.

Capturing state 903 references a state in which the predator UAV takes action to capture a threat UAV. For example, performing a soft-kill which disables and controls the threat UAV without directly destroying it and possibly aiding the threat UAV in accomplishing its mission, such as dispersing a hazardous payload carried by the threat UAV. The capture action taken by the predator UAV may include a countermeasure according to one of the embodiments described hereinabove. The predator UAV comprises host-side flight and payload control along with a host-side mount. A payload-side control is provided where the payload includes a soft-kill UAV capture mechanism. The host-side components may be configured to interoperate with a number of payload capture mechanisms which for a given predator UAV may be interchangeable dependent on a specific mission.

Perching state 905 refers to a state in which the predator UAV is in a standby mode awaiting control instructions to begin pursuing a potential threat, or to receive an instruction to return home. For example, a predator UAV may be implemented as part of a swarm. When a lead UAV senses the presence of a threat UAV, the perched UAV may receive a signal from the lead UAV instructing the perched UAV to go into service and begin a pursuit of the detected threat.

A pursuing state 907 occurs when the predator UAV has detected a threat UAV and takes action to begin closing in on the threat UAV. The detection may occur through sensors located within the predator UAV, or as discussed above, the predator UAV may receive a communication signal from another cooperating UAV which senses the threat UAV and informs the predator UAV of the detected threat. Based on the information collected by the detection sensors, the location, speed and other characteristics of the threat UAV are determined and flight control and operations for the predator UAV are implemented to pursue and overtake the detected threat UAV.

Patrolling state 909 refers to a state in which the predator UAV is patrolling an area of interest attempting to detect a threat UAV. While patrolling, onboard sensors within the predator UAV are actively processing information in an attempt to detect a potential threat. When a potential threat is detected, for example, through an acoustical signature belonging to a UAV operating nearby, processing circuitry in the predator UAV analyzes the detected data in an attempt to identify the potential threat as benign or not benign, and whether the potential threat is a target or a non-target object. Based on the analysis, flight and payload control measures are invoked to control the actions of the predator UAV appropriately for the determined situation.

Evading state 911 occurs when a threat is identified as non-benign, but the sensed data indicates that the detected threat is not a target. By way of example, an enemy may launch a countermeasure to the predator UAV designed to disrupt and destroy the predator UAV. Based on sensed information, such as the speed and closing pattern of the detected object, the predator UAV may be configured to recognize the threat as a countermeasure designed to pursue and destroy the predator UAV. In this case, flight control may be configured to perform evasive maneuvers to avoid the detected countermeasure.

Referring again to FIG. 9, exemplary transitions between states are indicated by arrows. The predator UAV may enter the homing state 901 from a perching state 905, capturing state 903, patrolling state 909 or evading state 911. A capturing state 903 may result from the transition of the predator UAV from a pursuing state 907, for example, when onboard sensors determine that the payload capture device should be implemented. From a capturing state 903, based on information collected as to the current status of the capture, the predator UAV may revert to a pursuing state 907, or may continue in a capturing state 903 as indicated by the circular arrow which self references capturing state 903. In a scenario where the capture is deemed to have been successful, the predator UAV may transition from the capturing state 903 to a homing state 901 where the predator UAV returns to a safe home location after a successful counter-UAV mission.

While in a pursuing state 907, which may be entered by the predator UAV from a perching state 905, a capturing state 903 or a patrolling state 909, the predator UAV may enter either a capturing state 903 or an evading state 911. For example, if sensors onboard the predator UAV determine that the predator UAV has closed in on a target sufficiently to deploy the payload capture mechanism, flight and payload control may be configured to place the predator UAV in a capturing state 903. On the other hand, if the onboard sensors determine that a detected threat is not benign and is not a target, flight control may be configured to place the predator UAV into an evading state 911 to prevent destruction of the predator UAV by a hostile countermeasure.

A perching state 905 may be transitioned to a pursuing state 907, a homing state 901, a patrolling state 909. Alternatively, the predator UAV may remain in a perching state 905. The perching state 905 may be entered from a patrolling state 909, for example, when no target is sensed in a predetermined amount of time, the predator UAV may be transitioned to a perching state 905 to conserve resources such as power.

A patrolling state 909 may be entered from a pursuing state 907, for example, when an identified target is not captured, or a sensed potential threat is later determined not to be a threat. In these cases, the predator UAV is transitioned from a pursuing state 907 to a patrolling state 909. Likewise, a predator UAV in a perching state 905 may be transitioned into service in a patrolling state 909. During operation, the predator UAV may remain in a patrolling state 909 as indicated by the circular arrow at patrolling state 909.

Evading state 911 may be entered from a pursuing state 907, for example, when a detected target is determined to be non-benign and a non-target, as in the case of a countermeasure designed to destroy the predator UAV. From an evading state 911, the predator UAV may remain in an evading state 911 as indicated by the circular arrow self-referencing evading state 911. The predator UAV may transition from an evading state 911 to a homing state 901. For example, when it is determined that countermeasure threat has been successfully evaded.

By way of non-limiting example, a sample scenario in a behavior based finite state architecture will now be described. Initially, the predator UAV is in a patrolling state 909. Triggered by a detection, the state transitions to pursuing state 905. If the identification of the detected object as prey is confirmed, then the pursuit continues. If, on the other hand, the detection is not prey, but benign and not of interest, the state reverts back to a patrolling state 909. Alternatively, if the detection is not prey and not benign, then the predator UAV enters an evading state 911 (e.g. based on a closing rate of the detected object). The pursuit behavior 907, for a verified target transitions to a capture behavior 903, which may be further divided into sub-states for approach and contact (not shown). If the capture is unsuccessful, the predator UAV returns to pursuing state 909. If at any time during the mission power reserves drop below a predetermined threshold, the predator UAV enters a homing state 901 and returns to home base.

While the state transition diagram depicted in FIG. 9 is an illustration of one embodiment of a non-abetting counter-UAV predator UAV, it is understood that a person of skill in the art may recognize other states, or transitions that may be used to embody a UAV-borne non-abetting counter-UAV measure. Other states and transitions used in any combination fall within the scope of this specification. The above state transitions are provided purely by way of non-limiting example to provide a better understanding of the embodiments described herein.

While exemplary drawings and specific embodiments have been described and illustrated herein, it is to be understood that that the scope of the present disclosure is not to be limited to the particular embodiments disclosed herein. For example, but not limitation, the DNC apparatus can be mounted to the wing or wings of the UAV depending upon the structure of the UAV. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. An apparatus for use as part of, or attached to, an unmanned aerial vehicle (UAV) to intercept and entangle a threat unmanned aerial vehicle, said UAV including a flight and payload control system for controlling power to said UAV and for controlling maneuvering of said UAV and a host-side mount for coupling to said UAV and in communication with said flight and payload control system, the apparatus comprising:
   a payload-side mount configured to be removably attached to said host-side mount, said payload-side mount comprising a power interface and a control interface between said payload-side mount and said host-side mount;
   a counter-UAV system coupled to said payload-side mount comprising:
      a deployment mechanism including a rigid mounting bar non-releasably affixed to said deployment mechanism;
      a payload coupled to said deployment mechanism comprising:
         a pair of cords, each of said pair of cords having a first end attached to said rigid mounting bar; and a deployable net disposed between said pair of cords, said deployable net having a cross-sectional area sized for intercepting and entangling said threat unmanned aerial vehicle.

2. The apparatus of claim 1, wherein said payload further includes a rigid rod, and wherein a bottom edge of the deployable net is attached to the rigid rod for positioning said deployable net in a deployed position.

3. The apparatus of claim 2, wherein each of the pair of cords has a second end attached to the rigid rod, and wherein the deployable net, the cords and the rigid rod form a net assembly.

4. The apparatus of claim 3, wherein the first end of each of the pair of cords is detachably connected to the rigid mounting bar.

5. The apparatus of claim 4, wherein the deployment mechanism further includes a flexible sling for maintaining the net assembly in a rolled-up, undeployed position.

6. The apparatus of claim 5, wherein the deployment mechanism further includes a clamp member operative to controllably retain and release the flexible sling to permit the rolled-up net assembly to unroll into the deployed position.

7. The apparatus of claim 1, wherein the UAV includes a fuselage and a wing, wherein the apparatus is configured as an attachable mission package including the payload-side mount configured to attach to the host-side mount of the UAV, and wherein the host-side mount of the UAV is located on one of the fuselage or the wing of the UAV.

8. An unmanned aerial vehicle (UAV) for providing counter-UAV measures, comprising:
   a flight and payload controller for controlling power to said UAV and for controlling maneuvering of said UAV;
   a host-side mount coupled to said UAV and in communication with said flight and payload control system;
   a payload-side mount configured to be removably attached to said host-side mount, said payload-side mount comprising a power interface and a control interface between said payload-side mount and said host-side mount;
   a counter-UAV system comprising:
      a counter-UAV measure, configured to be controlled by said flight and payload controller and coupled to said payload-side mount, wherein said counter-UAV measure is configured to non-destructively disable or capture a target UAV, said counter-UAV measure comprising:
         a deployable net;
         a rigid rod fixedly attached to a first edge along a width of said deployable net;
         two cords, each cord attached to a corresponding edge along a length of said deployable net; and
         a deployment mechanism including a sling assembly attached to an edge of said deployable net opposite said rigid rod and to a first end of each of said cords, said sling assembly having a sling configured to carry said deployable net in a non-deployed state and to suspend said deployable net from said UAV in a deployed state.

9. The UAV of claim 8, wherein said deployment mechanism further comprises:
   a clamp for releasably holding said sling in said non-deployed state;
   a servo coupled to said clamp and responsive to a deployment signal to cause release by said clamp such that the sling releases said deployable net when in said deployed state.

10. The UAV of claim 8, wherein said deployment mechanism further includes a mounting bar, and wherein a second end of each of said cords is connected to the mounting bar via a frangible tab.

11. An Unmanned Aerial System (UAS) for non-destructive capture and control of a threat Unmanned Aerial Vehicle (UAV), comprising:
   a host predatory UAV configured to pursue the threat UAV;
   a host-side mount coupled to said host predatory UAV;
   a payload capture device configured to disable and control the threat UAV;
   a payload-side mount configured to be removably attached to said host-side mount, said payload-side mount comprising a power interface and a control interface between said payload-side mount and said host-side mount; and
   a payload deployment mechanism configured to deploy said payload capture device via said control interface, said payload deployment mechanism comprising:
      a net;
      a sling supporting the net;
      a clamp releasably securing said sling to said payload-side mount; and
      a servo coupled to said clamp and configured to move said clamp to release said sling.

12. The UAS of claim 11, wherein said sling is configured to support the net in a rolled state.

* * * * *